(12) United States Patent
Long et al.

(10) Patent No.: US 6,224,476 B1
(45) Date of Patent: *May 1, 2001

(54) SHOCK-WAVE FOOD PROCESSING WITH ACOUSTIC CONVERGING WAVE GUIDE

(75) Inventors: John B. Long, Sarasota, FL (US); Richard A. Ayers, El Cajon, CA (US)

(73) Assignee: Hydrondyne Incorporated, Sarasota, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/346,730

(22) Filed: Jul. 2, 1999

(51) Int. Cl.[7] ............................................. A22C 9/00
(52) U.S. Cl. ............................. 452/141; 426/58; 426/238
(58) Field of Search ............................. 452/141; 426/58, 426/238

(56) References Cited

U.S. PATENT DOCUMENTS

| | | |
|---|---|---|
| 3,093,770 | 6/1963 | Wesley et al. . |
| 3,220,873 | 11/1965 | Wesley . |
| 3,492,688 * | 2/1970 | Godfrey ................................ 452/141 |
| 3,594,115 | 7/1971 | Wesley . |
| 3,711,896 * | 1/1973 | Guberman et al. .................. 452/141 |
| 4,458,153 | 7/1984 | Wesley . |
| 4,591,485 | 5/1986 | Olsen et al. . |
| 5,026,484 | 6/1991 | Juvan . |
| 5,256,430 | 10/1993 | Suzuki et al. . |
| 5,273,766 * | 12/1993 | Long ..................................... 452/141 |
| 5,302,881 | 7/1994 | O'Loughlin . |
| 5,328,403 | 7/1994 | Long . |
| 5,368,724 | 11/1994 | Ayers et al. . |

(List continued on next page.)

FOREIGN PATENT DOCUMENTS

| | | |
|---|---|---|
| 0 516 080 A2 | 12/1992 | (EP) . |
| 98/38875 | 9/1998 | (WO) . |
| 98/54975 | 12/1998 | (WO) . |

OTHER PUBLICATIONS

Donavan, Doug, "What a blast"., Forbes Entreprenuers. (Jul. 27, 1998).

Raloff, Janet, "Ka–Boom! A shockingly unconventional meat tenderizer.", Science News, vol. 153, pp. 366–267 (Jun. 6, 1998).

"Development to Watch. Innovations.", Business Week (Oct. 30, 1997).

"Tender beef poised for a boom.", Financial Times (Oct. 30, 1997).

"Meat tenderizing could be a blast.",Industry Week (Dec. 17, 1997).

"Anti–gravity. Tender is the bite.", Scientific American (Jan. 1998).

Antosh, Nelson., "Company touts TNT tenderizing.", Houston Chronical (Nov. 5, 1997).

(List continued on next page.)

Primary Examiner—Willis Little
(74) Attorney, Agent, or Firm—Browdy and Neimark

(57) ABSTRACT

Water and meat pieces (P) are pumped through a conduit (100), the walls of which are made of plastic having an acoustic impedance close to that of water. The conduit is immersed in a tank (400) full of water. A shock wave generator 200 (capacitor discharge through electrodes) creates a shock wave in the water. A preferably tubular wave guide directs the shock pulse onto the conduit. The shock wave passes through the conduit without substantial reflection because the impedance of the conduit wall matches the impedance of the water. The shock wave tenderizes and sterilizes the meat. Continual plasma discharges are repeated rapidly enough that all of the meat passing through is treated.

9 Claims, 3 Drawing Sheets

U.S. PATENT DOCUMENTS

| | | |
|---|---|---|
| 5,397,031 | 3/1995 | Ayers et al. . |
| 5,430,691 | 7/1995 | Fridman . |
| 5,588,357 | 12/1996 | Tomikawa et al. . |
| 5,611,993 | 5/1997 | Babaev . |
| 5,841,056 | 11/1998 | Long . |

OTHER PUBLICATIONS

"Tender meat closer.",Meat Processing (Jan. 1998).

Marriott, Norman., "Tenderize with shock waves.", Meat & Pooultry (Dec. 1997).

Lee, Jill., "Hydrodyne.", Agricultural Research (Jun. 1998).

"New meat tenderizing process.", Food Industry News (Jun. 1998).

Food Quality, vol. 5, No. 5 (Mar. 1998).

"Hydrodyne process promises tenderized meat faster –with greater food safety,", Meat Business (Jan. 1998).

Salvage, Bryan., "Hydrodyne process may be 'Off the Wall, but it works.", Meat Marketing & Technology (Dec 1997).

The National Provisioner (Jan 1998).

* cited by examiner

SHOCK-WAVE FOOD PROCESSING WITH ACOUSTIC CONVERGING WAVE GUIDE

FIELD OF THE INVENTION

The present invention relates to certain embodiments for processing of meat or other food products by shock waves, preferably plasma generated by capacitive discharge between two electrodes.

REVIEW OF THE RELATED TECHNOLOGY

As explained in the copending application of John Long, filed on even date herewith and entitled "Continuous Shock-Wave Food Processing With Shock Wave Reflection", which is entirely incorporated herein by reference, meat can be tenderized and at least partially sterilized by shock waves (acoustic or pressure pulses) from an explosions caused typically by a chemical explosive charge or a capacitive discharge between two electrodes such as shown in the John Long U.S. Pat. Nos. 5,273,766 and 5,328,403, and pending applications, two of which correspond to WO98/38875 and WO98/54975. A shock wave travels outwardly from the explosion site at the speed of sound (or somewhat higher in the case of high-intensity shock waves) and, like an audible sound echoing from a wall, will reflect from a shock-wave reflective surface.

The condition for reflection of a shock wave is that the speed of sound, which varies depending on the medium through which it travels, changes at an interface between two media. A pressure wave travels in water at about 1500 meters per second; the same wave travels in stainless steel at 5800 meters per second, nearly four times faster. This difference in the speed of sound is close to the difference in speed for shock waves, which are basically high pressure sound waves; they propagate by the same mechanism as sound does, but are sharp pulses and typically have a much higher sound intensity or pressure rise (sometimes called "overpressure") than most sounds.

When a sound or shock wave in water encounters a steel surface, most of the wave is reflected away from the surface because of the difference in speed (also referred to as an "acoustic impedance mis-match"), with only a small portion passing into the steel. In the aforementioned related technology, the reflection of shock waves from a thick steel surface was used to increase the intensity of the shock pulse. The pulse from an explosion is brief but has an appreciable width, and when the pulse is reflected from steel it passes through itself, increasing the shock wave pulse intensity. (The same effect is seen at a seawall, where ocean waves reflecting from the wall splash to a greater height up the wall than they reach in open water.)

U.S. Pat. Nos. 5,397,961 and 5,368,724 in the names of Ayers et al disclose a shock wave reflector reflecting a shock wave originating from a spark between electrodes. The diverging shock wave from the approximately point-source electrode gap expands spherically and encounters reflective surfaces which are "parabolic" or "hemispherical" (see column 3, lines 60 or 61 of the '724 patent) or "concave" (see column 4, line 30 of the '961 patent). The shock wave is apparently converted to a plane wave front which then is funneled into a horn-shaped "concentrator" to increase its intensity. These patents do not disclose any focussing, and do not relate to the treatment of meat to improve meat for consumption.

In a preferred embodiment according to Long '766 and '403, the meat was placed in evacuated plastic bags which were lined along the bottom of a hemispherical steel shell, the shell was filled with water, and an explosion was set off in the geometrical center. The shock wave travelled outward to reach all the meat at roughly the same time and hit the meat with roughly the same overpressure or shock wave intensity, passing through the meat twice due to the reflection. (The meat and the enclosing bags, having an acoustic impedance close to that of water, do not appreciably reflect the shock pulse.)

This system works very well in tenderizing and at least partly sterilizing the meat lined around the shell, but it has some drawbacks. Importantly, this system is inherently a batch operation, and the equipment is expensive. A stainless steel hemisphere four feet diameter and two inches thick is not cheap, and the equipment needed for moving blast shields, water changers, and so on is complex and costly. Packing and removing the meat is slow, and further delays are mandated by safety concerns; workers should not load the hemisphere while the explosive is rigged, for example.

Another drawback is that the water is blown out of the hemispherical shell by the explosion and must be replenished. In the case of chemical explosives, it is preferable to drain off any remaining water and replace it with fresh water which is untainted by chemical by-products of the explosion, even through such water does not even come directly in contact with the meat. This takes time and uses a great deal of water.

Morever, the explosive force in the aforementioned embodiments is not balanced. The geyser of blast gases, steam, and spray emanating from the top of the hemisphere causes a large reaction force which drives the hemisphere downward, and this must be resisted by large springs, dashpots, and so on. A special blast-shield dome is needed to absorb the force of the geyser.

Placing meat into protective plastic bags can cause problems because any air bubble which gets packed into the bag along with the meat will act as an acoustic "lens", focusing the shock wave (this is similar to the converging-lens effect of a water droplet with light). The bubble will focus the shock wave onto the meat just on the other side of the bubble, causing a very high local pressure which can "burn" the meat. The heat so generated will often also burn a hole in the bag causing the plastic bag to rupture.

The placement of the meat against or in near adjacency to the surface of the steel is the root of some of the difficulties with previous embodiments as discussed above, and such placement has limitations which prevent any substantial improvement. The thickness of the layer of meat which can be tenderized is limited by the duration of the shock pulse, because if all the meat is to be subjected to intensity doubling then the width of the shock pulse must be at least twice the thickness of the meat, so that the pulse intensity will be doubled throughout the thickness of the meat. If the pulse is of very short duration, its trailing edge will have passed into the meat layer just as the leading edge is reflecting from the steel, and only the portion of meat closest to the steel will experience the doubled shock intensity; the rest will undergo two passes of the non-doubled shock wave. The width of the shock pulse in meters is roughly 1500 m/s divided by the pulse duration in seconds.

Limiting the thickness of meat means that the size of the hemisphere must be increased if each batch of meat to be treated is to be large enough that the overall processing rate is not too slow. But increasing the hemisphere diameter means that the shock pulse will be weaker, since the intensity of a spherical wave falls off approximately as the cube of the radius (which corresponds to the distance from the sources of the explosion).

SUMMARY OF THE INVENTION

If the intensity doubling of the earlier embodiments were not insisted on, then the layer of meat could be spaced further away from the shock-wave reflective inner surface of the hemispherical shell, and the greater intensity of the shock wave would make up for the intensity doubling. If the meat were moved inwardly by about 29% of the hemisphere radius (precisely, 1.000 minus 0.707) then the single-pass shock wave intensity would be just as great as the doubled intensity at the inner surface of the hemisphere, even if the explosion energy were not increased. (The shock wave would pass outwardly through the meat and then, after reflection from the steel surface, pass back inwardly through the meat.) This shows that placing the meat directly against or closely adjacent a reflective surface is not essential.

However, the problem then arises as to how the meat can be supported against moving away from the explosion, partly due to the gas bubble produced by chemical explosives. The present invention employs a separate meat container which, unlike thick stainless steel, has as little reflectivity as possible so that the shock wave passes through it freely. The container can be made "acoustically transparent", so that a sound wave or a shock wave will pass through the container without being diverted in direction or delayed in passage.

There are several ways to make a container transparent. One is make the container of wires, which sound (and a shock wave) can pass around, but a wire container will not in all cases adequately support the meat; and, depending on the size and number of the wires, will cause attenuation of the shock wave. A preferred way, though, is to make the conduit of a material having the same "acoustic impedance" as the liquid in which it is immersed. If the impedances of the container material and the liquid are about the same, then the shock wave will have the about the same speed in both materials. According to Huygens' principle, the waves then will not be bent by refraction. Neither will they reflect from the interface between the liquid and container material.

(An analogy can be made to light waves. If a solid object immersed in water has an "index of refraction" (optical impedance) close to that of the water, it will be nearly invisible because the light rays passing through it will not bend. For example, a piece of clear ice or glass is less visible in water than in air, because there is little difference between the indices of refraction.)

If the liquid is water as is preferred, the container may be made of a material in which the speed of sound is similar. Such materials are available. In gum rubber, for example, the speed of sound is only 3% higher than in water, and several more durable plastics are close enough in their acoustic impedances to water that they are quite suitable for the meat container. One suitable and well-known material, which is approved for use with food, is TYGON, which is a plasticized vinyl polymer; others are polyethylene, polypropylene and polyurethane. If a hemispherical meat container made of TYGON or the like were suspended concentrically inside the hemispherical shell, the meat could be tenderized without the need for reflection, as discussed above.

But this would not eliminate the problems with the earlier embodiments, namely the need for batch processing, dealing with the large gas bubble produced by the explosion of a chemical explosive, and the associated slowness and complex equipment. In order to attain continuous processing, the present invention exchanges the earlier hemispherical geometry for an essentially cylindrical geometry, while in some embodiments the batch container is exchanged for a conduit (e.g., a TYGON tube) through which the meat product is pumped or carried by flowing water. The advantages of a pipe having a solid wall of suitable-impedance plastic, transparent to the short wave, as compared to a conduit made of fine mesh, are evident in relation to food transport; such a tube is also more "transparent" to shock waves than is a mesh or framework. TYGON, and other suitable plastics, are available in the form of tubing.

In place of the steel hemisphere the present invention preferably provides an acoustic wave guide which guides the shock wave from a single explosion site to a hollow container (meat holder) over plural paths of roughly equal length, so that the shock wave front arrives at the container roughly simultaneously from different directions.

The container may be embodied as a conduit through which meat is pumped for continuous processing, while explosions, i.e. plasma discharges in the case of electric discharge, are set off at the single explosion site repeatedly, at short enough intervals so that all of the meat passing through the conduit is exposed to shock-wave treatment. The simultaneous arrival of the portions of the shock-wave front over equal-length paths creates a very high pressure pulse at the convergence zone.

From a single plasma discharge, approaching a point source, a spherical shock wave expands rapidly and uniformly until it encounters a change in acoustic impedance and is reflected or refracted. With a proper arrangement of reflective surfaces the expanding spherical shock wave from the single plasma discharge can be guided so that the reflections impinge on the meat in the conduit from several directions simultaneously.

If the "rays" (portions of the wave front travelling perpendicular to the wave front surface) all travel the same distance to reach the conduit, then the waves will impinge on the meat inside the conduit simultaneously.

The present invention greatly speeds the processing of meat (or other products) by moving the shock-wave reflective surfaces further away from the meat and positioning and supporting the meat with the use of an acoustically transparent conduit, and by providing the shock-wave reflective surface in the form of a wave guide. The present invention thus meets a main object of providing improved treatment, and it also meet the object of overcoming other deficiencies in the earlier embodiments noted above.

BRIEF DESCRIPTION OF THE DRAWING

The above and other objects and the nature and advantages of the present invention will become more apparent from the following detailed description of embodiments taken in conjunction with drawings, wherein.

DETAILED DESCRIPTION OF THE PREFERRED EMBODIMENT

Here, and in the following claims:

"shock wave", "acoustic pulse", "pressure spike", and similar terms, are used generally interchangeably. All describe an acoustic wave or pressure wave travelling at (or above) the speed of sound. The terms such as "shock wave" also encompass high-energy square waves, sinusoidal waves, and the like generated by loudspeakers and underwater sirens. A sound having a frequency is merely a repetition of shock waves, and by Fourier's theorem a shock wave is composed of frequencies. The present invention contemplates treatment of food products by high-intensity sounds, whether in discrete pulses or not;

"conic section" has the usual mathematical definition: circles, ellipses, parabolas, and so on; and "wave guide" means a structure guiding a substantial portion of the energy of a wave from one location to another location without substantial loss.

Figure 1:
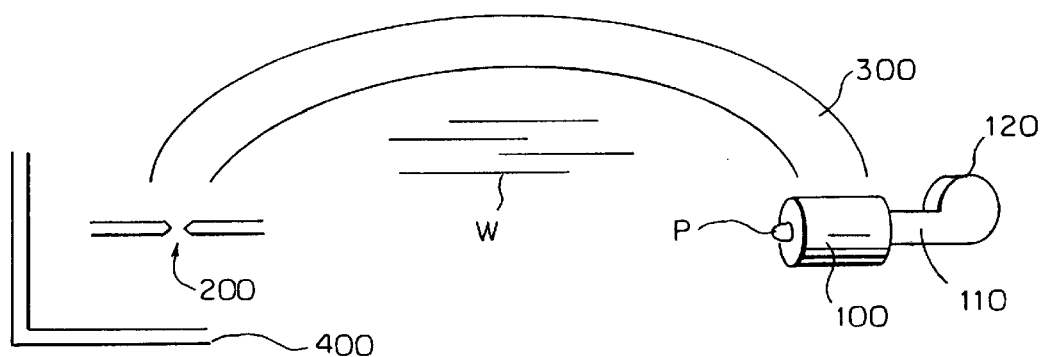
FIG. 1 is a schematic perspective view of the invention.

FIG. 1 shows the invention schematically in overview. A food product P, which might be for example deboned chicken parts in water as illustrated, or instead a semi-solid cylinder of hamburger (meat slurry), moves through a plastic or other acoustically transparent conduit 100, optionally propelled by a mixer/pump 120 coupled to a feed pipe 110. Alternatively, the conduit 100 can be replaced by a container, such as a plastic bucket with a lid, for a static or semi-continuous operation.

Water W, contained in a tank 400, surrounds the conduit 100; for clarity, only a corner of the tank 400 is depicted.

As indicated above, the conduit 100 is preferably made of a plastic or other material acoustically impedance-matched to water. Inside the conduit 100 the food product, or mixture of food pieces and water, is itself largely composed of water. Therefore the region of the conduit 100 consists of either water or substances which are acoustically similar to water and therefore this region is substantially acoustically homogeneous. Shock waves or sounds can pass across it with no great deflection or reflection.

Adjacent to the conduit 100 is a wave generator, preferably electric-arc discharge electrodes 200 between which a discharge, as from an electrostatic capacitor (not shown), may occur, setting up a shock wave in the water W. Alternatively, a chemical explosive, somewhat similar to a non-fragmentary hand grenade, could be used to create a pressure pulse.

Upon discharge a shock wave expands outward. One portion of the shock wave is guided to the container or conduit 100 through a wave guide 300 which may take various forms within the scope of the present invention, such as exemplified below.

In the case where more than one wave guide 300 is used (or when a single wave guide incorporates multiple shock wave paths), the arrival of different portions of the shock wave at the conduit 100 can be made generally simultaneous by making all the shock wave paths equal in length.

Instead of water, any liquid (or even gaseous fluid) may be used to transmit the shock waves through the tank 400 and/or to transport the food product P, in particular, an aqueous mixture of water and such substances as salts, pH adjusting substances, disinfectants, surfactants, etc. In this case the acoustic impedance of the conduit 100 may be adjusted accordingly.

It is noted that the liquid in the tank 400 may be different from the liquid in the conduit 100. These two liquids may have somewhat different acoustic impedances. If the acoustic impedances of the conduit 100, the first liquid, and the second liquid are all generally similar, then shock waves passing over the conduit will not be substantively diverted (reflected or refracted) and the meat P inside the conduit 100 will be treated as desired.

Figure 2A:
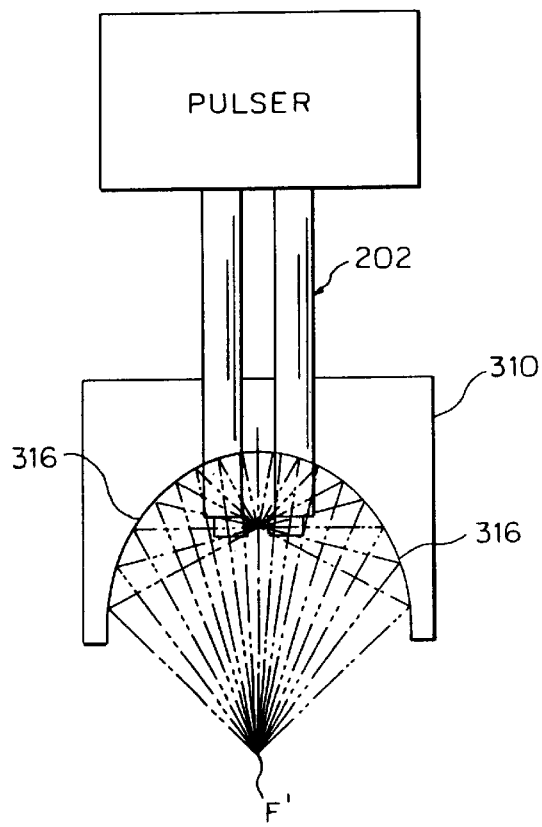
FIG. 2a is a schematic cross-sectional view.

FIG. 2a is a cross sectional schematic view of an arrangement related to the present invention. It uses a portion of a chamber 310 with an inner ellipsoidal surface 316 and no conduit. (An ellipsoid is a concave or egg-shaped surface which is generated by rotating an ellipse about either one of its two axes, major or minor. It is not the same as a paraboloidal reflector (usually called a "parabolic" reflector) which converges parallel rays to a point, as at the focus of the telescope. A paraboloidal reflector can precisely focus rays from infinity onto a point, but it cannot accurately focus rays from one close point onto another close point. However, an ellipsoid can do this and therefore is preferable to a "parabolic" reflector for point-to-point convergence.)

A pulser (e.g., a triggered or repeating capacitive discharge circuit) sends current via high current feeders 202 to the electrodes (obscured by rays in FIGS. 2a and 2b), producing a shock wave, the rays of which are indicated by dot-dash lines. (A ray is perpendicular to a wave front). Part of the shock wave (not indicated in FIG. 2a) escapes and part is reflected from the ellipsoidal surface 316 and reconverges to a focus F. Because the shock wave increases in intensity as it converges, the pressure pulse at the focus F is very strong.

Figure 2B:
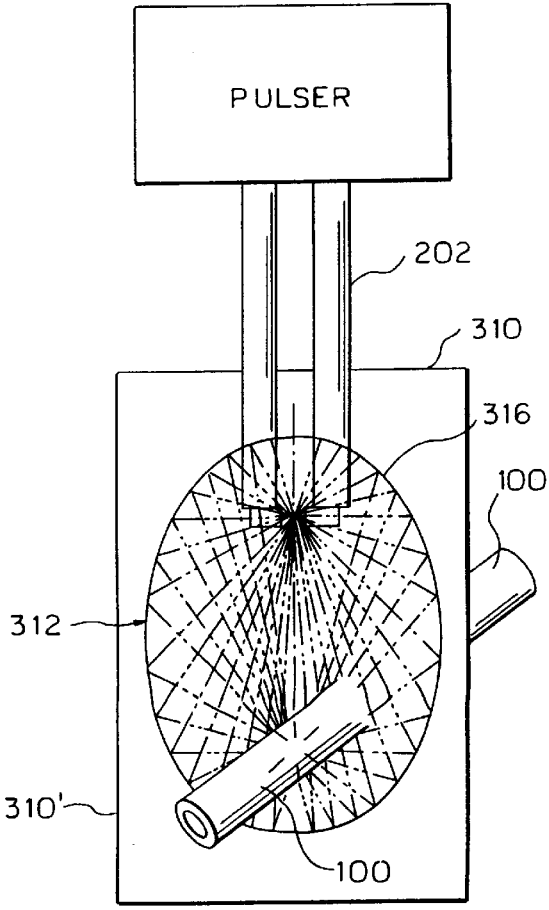
FIG. 2b is a schematic cross-sectional view of the present invention.

FIG. 2b shows an embodiment in which the ellipsoidal surface 316 of FIG. 2a is continued into a substantially enclosed surface by adding a second chamber 310' at the rim of the first chamber 310 of FIG. 2a (e.g., by welding). This geometry transfers virtually all of the shock pulse originating at the explosion site down to the focus region (below the explosion site in FIG. 2b). The entire shock wave is guided from one location to another. This greatly increases the efficiency.

The conduit 100 is shown in FIG. 2B passing over the focal region. Because acoustic waves can readily pass through the conduit 100, the meat inside is subjected to the very concentrated pressure pulse at the focal region. Optionally, the ellipsoidal walls 316 of the chamber 310 may be roughened, or aberrations deliberately introduced into the interior shape, to defocus the wave sufficiently that the entire inside cross section of the conduit 100 reaches a sufficiently high over-pressure, without shape focus to a point.

Figure 3:
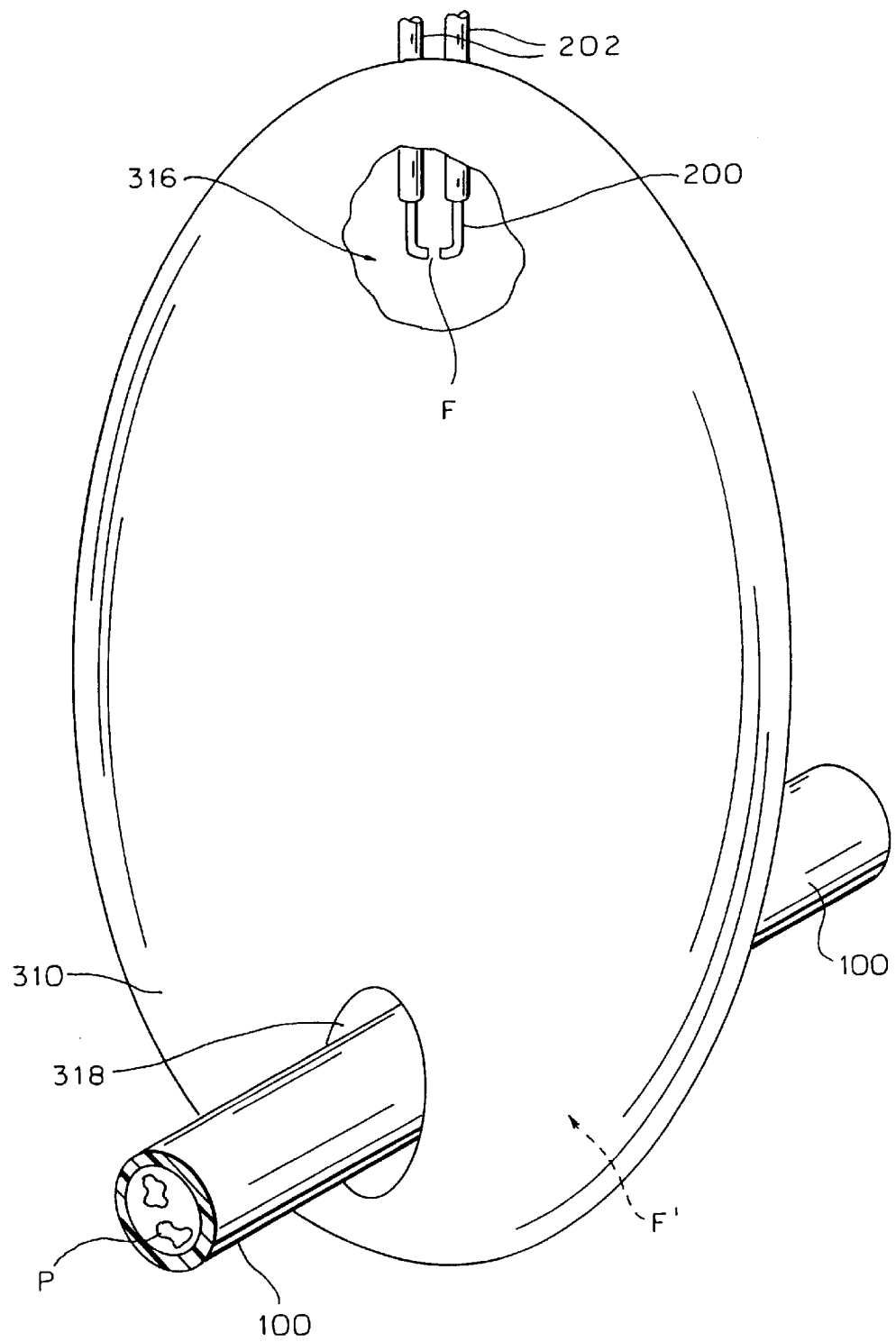
FIG. 3 is a perspective, partially cut-away view of the embodiment of the invention shown in FIG. 2b.

FIG. 3 depicts the ellipsoidal embodiment of the present invention in a perspective view. Here the chamber 310 is ellipsoidal on the outside as well as on the inner surface 316. The feeders 202 pass through the chamber wall to electrodes 200 at one focus of the interior ellipsoid and the other focus F' is inside the conduit 100. Optionally, an opening 318 allows water displaced by the steam bubble of the plasma discharge to escape from the chamber 310 into the surrounding tank 400 (not shown in FIG. 3). After the explosion, any water within the tank 400 which may have been displaced will immediately flow back to surround the conduit 100, in time for the next plasma discharge that will treat the meat yet to arrive at the shock wave zone. The meat food product P is treated continuously by the continual repeated explosions at the electrodes.

Figure 4:
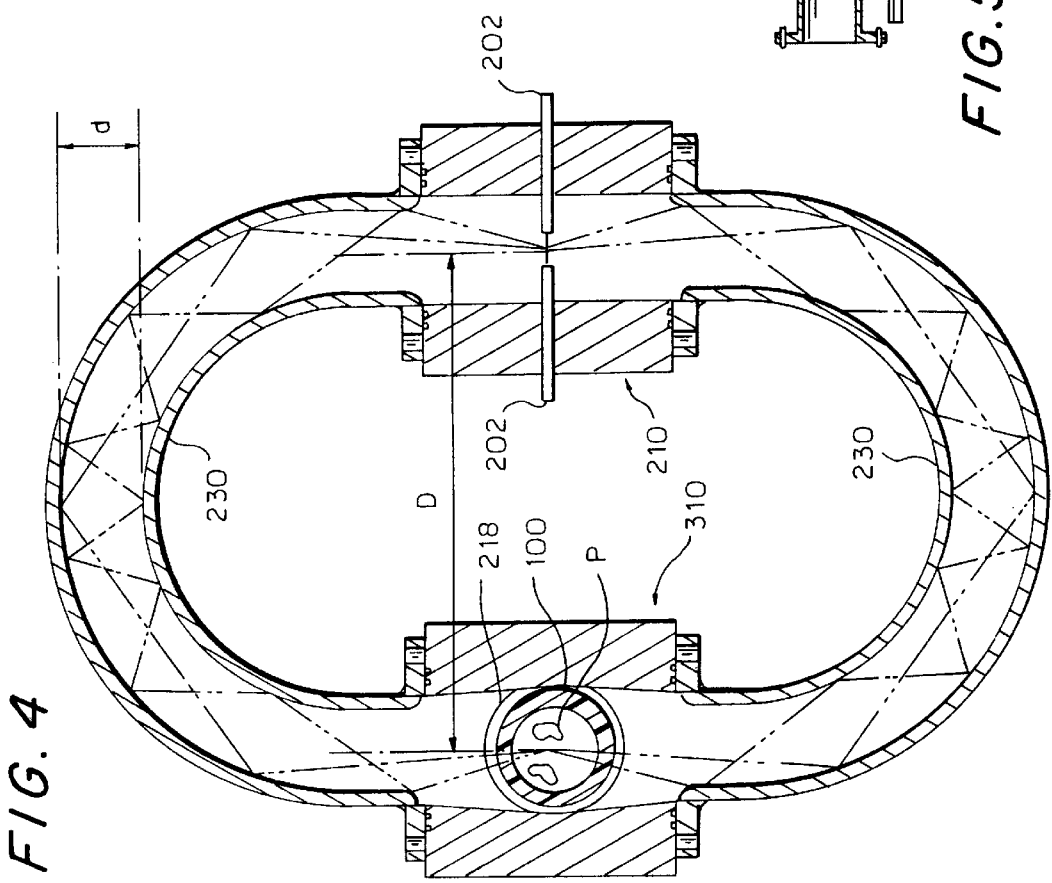
FIG. 4 is a partially schematic elevational view of a second embodiment.

FIG. 4 shows a second and more preferred embodiment in which the wave guide takes the form of a heavy-duty shock-reflective hollow tube which is preferably radially symmetrical, but which may have a variety of cross-sections, although circular is preferred, like the wave guides used for microwaves. Mounted inside the tank 400 (not shown in FIG. 4) are a discharge chamber 210, a treatment chamber 310, and the wave guide in the form of torroidal pipe 230. While the wave guide pipe 230 is shown as being torroidal, it may instead take a variety of other shapes.

Figure 5A:
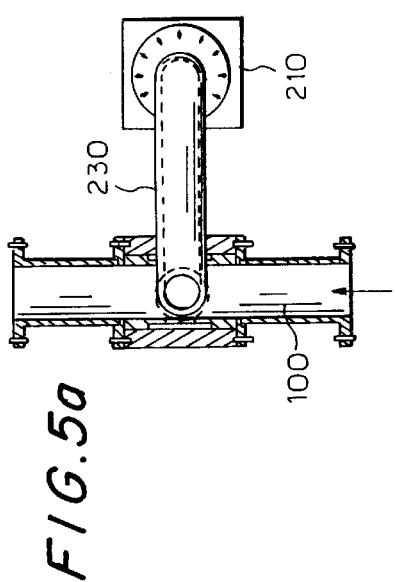
FIGS. 5a, 5b, and 5c are top, elevational, and end views of the embodiment of FIG. 4.
Figure 5B:
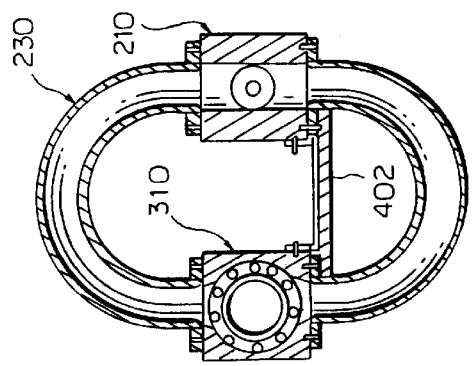

In FIG. 4, as in FIG. 5b, the meat-transporting conduit 100 is perpendicular to the plane of the paper. The ends of both halves of the toroidal pipe 230 are coupled into both the discharge chamber 210 and the treatment chamber 310.

Mechanical support for the tubular pipe 230 and chambers may be provided by a support 402 (FIG. 5b).

An explosion inside the explosion chamber 210 creates shock waves which travel along the inside of the tubular pipe, bouncing off the reflective curved surfaces of the pipe 230 as they progress (indicated by dash-dot lines in FIG. 4), and reaching the treatment chamber 310 simultaneously because of the equal lengths of the two sections of the tubular pipe coupling the explosion chamber 210 to the treatment chamber 310.

The plural wave-guiding pipes of the FIG. 4 embodiment perform the same function as the embodiment of FIG. 3, namely that of focussing the energy of the shock wave onto the conduit 100, but with a broader wave front.

The present invention includes the use of more than two pipes to convey shock pulses in balanced fashion to the treatment chamber 310. Any number greater than two can be used, and if of equal length can be of any shape.

Figure 5C:
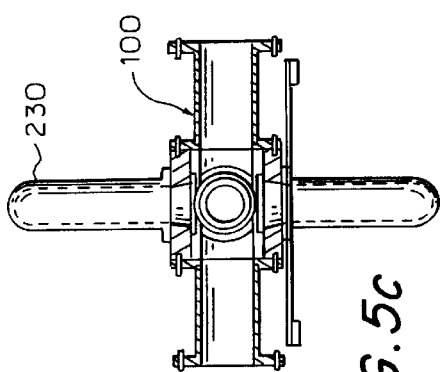

FIGS. 5a–5c show the embodiment of FIG. 4 is various views.

In the following claims, an acoustic impedance of a conduit material is "similar" to the acoustic impedance of the surrounding liquid if a shock wave impinging on the conduit is refracted or reflected at the surfaces of the conduit to such a small extent that food products in liquid inside the conduit are subjected to a sufficient shock wave intensity, in spite of such refraction or reflection, to tenderize and/or sterilize the food product.

It is noted that the acoustic impedance of the conduit wall may be partly a function of wall thickness or structure (e.g. porosity). A shock wave may pass through a very thin layer of steel which would substantially reflect the shock wave if the steel were thicker. Thus materials having an acoustic impedance less closely matched to that of the liquids can be used in the present invention depending on geometry.

Because the speed of a shock wave can vary with intensity, and intensity can vary with distance from the shock wave generator (chemical charge or electrode), the present invention contemplates adjusting the path distance from the explosion to the conduit (including any reflections or refractions) to account for such variations. Also, when the invention employs refraction (i.e. acoustic lensing) to guide shock waves onto the conduit, the delay in transit time from the explosion to the conduit will take into account the different speed of the shock wave within the refractive medium. For example, an air-filled bladder inside a liquid can change the angle of a shock wave and by suitably shaping the bladder the shock wave can be guided onto the conduit; but the shock wave will be slowed while in the air and arrive later than if it had passed through liquid.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . . " and "means for . . . " as may be found in the specification above and/or in the claims below, followed by a functional statement, are intended to define and cover whatever structural, physical, chemical or electrical element or structure may now or in the future exist which carries out the recited function, whether or not precisely equivalent to the embodiment or embodiments disclosed in the specification above; and it is intended that such expressions be given their broadest interpretation.

What is claimed is:

1. An apparatus for treating a food product, comprising:
a first liquid having a first liquid acoustic impedance;
a conduit immersed in the first liquid and containing a second liquid having a second liquid acoustic impedance, the conduit having a conduit acoustic impedance similar to the first liquid acoustic impedance and to the second liquid acoustic impedance, whereby acoustic waves are not substantially diverted by the conduit;
a single shock wave generator producing an acoustic wave expanding substantially from a first point; and
a focussing acoustic wave guide disposed outside the conduit to converge the acoustic wave onto the conduit over plural acoustic paths of generally equal length to a downstream focus area;
whereby the food product may be immersed in the second liquid inside the conduit and treated by the acoustic waves converging thereon generally simultaneously at the downstream area.

2. The apparatus according to claim 1, wherein the acoustic waves produce a quasi-hydrostatic pressure rise inside the conduit.

3. The apparatus according to claim 1, wherein a net impulse of the converging the acoustic wave is substantially balanced, whereby no substantial lateral net force is exerted on the conduit.

4. The apparatus according to claim 1, wherein the wave guide comprises a reflective curved surface.

5. The apparatus according to claim 4, wherein a cross section of the curved surface comprises approximately a conic section.

6. The apparatus according to claim 1, comprising a pump for pumping a mixture of the food product and the second liquid through the conduit.

7. The apparatus according to claim 1, wherein the acoustic wave generator comprises an electrode coupled to an electric discharge circuit and wherein the discharge circuit continually discharges to create explosions at the electrode at a rate such that all of the food product passing along the conduit is treated by shock waves from the wave generator.

8. The apparatus according to claim 1 comprising two wave guides in the form of pipes which are directed to opposite sides of the downstream area.

9. A method for treating a food product, comprising:
providing a first liquid having a first liquid acoustic impedance;
providing a conduit immersed in the first liquid and containing a second liquid having a second liquid acoustic impedance, the conduit having a conduit acoustic impedance similar to the first liquid acoustic impedance and to the second liquid acoustic impedance, whereby acoustic waves are not substantially diverted by the conduit; and producing an acoustic wave expanding substantially from a single shock wave generator at a first point; and converging the acoustic wave onto the conduit over plural acoustic paths of generally equal length substantially to a second focus point via a focussing acoustic wave guide disposed outside the conduit;

whereby the food product immersed in the second liquid inside the conduit is treated by the acoustic waves converging thereon generally simultaneously at the second point.

* * * * *